United States Patent [19]

Yates et al.

[11] 3,986,995
[45] Oct. 19, 1976

[54] FRIABLE COMPOSITIONS AND PROCESS FOR PRODUCING SAME

[75] Inventors: James E. Yates; Paul H. Washecheck, both of Ponca City, Okla.

[73] Assignee: Continental Oil Company, Ponca City, Okla.

[22] Filed: Feb. 10, 1975

[21] Appl. No.: 548,311

Related U.S. Application Data

[60] Division of Ser. No. 465,950, May 1, 1974, Pat. No. 3,883,362, which is a continuation-in-part of Ser. No. 425,379, Dec. 17, 1973, abandoned.

[52] U.S. Cl. .......................... 260/23 XA; 106/268; 260/23 R; 260/28.5 A
[51] Int. Cl.$^2$ ..................................... C08L 91/00
[58] Field of Search ...... 260/23 R; 106/268, 23 XA, 106/28.5 R, 28.5 A, 269

[56] References Cited
UNITED STATES PATENTS

| | | | |
|---|---|---|---|
| 2,404,896 | 7/1946 | Aoliny | 106/268 |
| 3,470,006 | 9/1969 | Brunel | 106/269 |

Primary Examiner—Donald E. Czaja
Assistant Examiner—William E. Parker
Attorney, Agent, or Firm—Cortlan R. Schupbach, Jr.

[57] ABSTRACT

Friable compositions suitable for use as extrusion aids in polymeric extrusion formulations are prepared by a process which comprises mixing a paraffinic hydrocarbon wax, calcium hydroxide and a fatty acid while heating to a temperature of at least 150° C and thereafter cooling to recover a solid, glass-like, friable composition, said paraffinic hydrocarbon wax having a drop melting point of at least 110° F, an oil content of not greater than 50 percent by weight and a needle penetration value (77° F) in the range of 1 mm to 20 mm, and said fatty acid being a $C_{16}$–$C_{24}$ aliphatic hydrocarbon monocarboxylic acid or mixtures thereof.

11 Claims, No Drawings

FRIABLE COMPOSITIONS AND PROCESS FOR PRODUCING SAME

This is a division of application Ser. No. 465,950, filed May 1, 1974, now U.S. Pat. No. 3,883,362 which in turn is a continuation-in-part of Ser. No. 425,379, filed Dec. 17, 1973, now abandoned.

This invention relates to a process for preparing a composition from paraffinic hydrocarbon waxes, calcium hydroxide, and certain fatty acids which are solid, glass-like and friable at ambient conditions. The compositions can be ground or otherwise reduced to discrete particles having less tendency to fuse or coalesce than the paraffinic hydrocarbon waxes but can be used as extrusion aids in thermoplastic formulations as they begin to become fluidized under elevated temperatures of the order of 100° C or higher.

Polyvinyl chloride and other thermoplastic extrusion formulations commonly include paraffinic hydrocarbon waxes and calcium salts of certain fatty acids such as calcium stearate as extrusion aids. Since the extrusion formulations are generally fed to an extruder as a mixture of particulate solids, it is desirable that any additives to the formulations, including the abovementioned extrusion aids, be in a discrete solid, particulate form and capable of being handled as solids. While the calcium salts present no difficulties along this line only certain high quality paraffinic hydrocarbon waxes can be used. Relatively soft waxes or those of a less pure nature containing quantities of oils or other solvents are generally unacceptable from a materials handling viewpoint; e.g., they may not form discrete particulate solids or they may not sufficiently retain such physical form on storage or both. As a result, a great many paraffinic hydrocarbon waxes are excluded from use with thermoplastic formulations although if it were not for their lack of materials handling capability they would be suitable extrusion aids in such formulations.

In accordance with this invention, there is provided a process for preparing a composition embodying both paraffinic hydrocarbon waxes and calcium salts wherein the calcium salts are formed in situ from calcium hydroxide and certain fatty acids which composition is solid, glass-like and friable at ambient temperaures and can be ground or otherwise reduced to discrete particulate form having reduced tendency to fuse or coalesce on standing than the paraffinic hydrocarbon waxes by themselves. The composition still begins to become fluidized at elevated temperatures; e.g., 100° C, thus rendering them suitable for extrusion operations. This invention, therefore, provides a process for rendering relatively soft, amorphous waxes, or those of a less pure nature, suitable for solids handling situations such as with thermoplastic extrusion formulations. Further, when the compositions produced by this process are used in thermoplastic extrusion formulations, there is an added benefit in that a single material provides both the paraffinic hydrocarbon wax requirement as well as the calcium salt requirement. Quite obviously, the invention is applicable to higher quality harder waxes as well.

It is emphasized at the outset that the composition prepared with the process of this invention is not a mere physical blend wherein each component contributes its individual properties without any interaction with each other. Rather, the physical form of the composition is unlike either of the individual components. The composition is best characterized as being a glass-like, friable solid at ambient conditions and might be described as resulting from a synergistic action between the components. From a physical chemistry standpoint, it is not known what actually occurs in forming the composition although some of those skilled in the art might make analogy to the grease art.

Broadly, the process of the invention comprises mixing paraffinic hydrocarbon wax, calcium hydroxide and certain fatty acids while heating the mixture to at least about 150° C, preferably at least 180° C, and thereafter cooling and recovering the solid, glass-like, friable composition.

The fatty acids which may be employed are the $C_{16}$–$C_{24}$ aliphatic hydrocarbon monocarboxylic acids or mixtures thereof. These acids may be saturated or unsaturated. When mixtures of the acids are used, they may contain up to about 15 weight percent of a $C_{14}$ aliphatic hydrocarbon monocarboxylic acid of the same saturation characteristics outlined above. Illustrative of suitable acids are palmitic, stearic, oleic, linoleic, eicosanic, behenic, tall oil fatty acid, hydrogenated vegetable fatty acid, hydrogenated tallow fatty acid, distilled cottonseed fatty acid, and the like. Various commercial grades of suitable acids are available, some of which are listed in *Fatty Acids and Their Industrial Applications* by E. S. Pattison, 1968, at Page 7, Table 1–2 (excluding high lauric). These suitable commercial acids are generally mixtures of the acids hereinbefore described and may additionally have small amounts of certain impurities depending on their method of manufacture.

The calcium hydroxide employed may be any commercial grade material such as slaked lime or hydrated lime.

The suitable paraffinic hydrocarbon waxes are generally derived from petroleum sources. These waxes contain a variety of hydrocarbon structures, for example normal paraffins, isoparaffins, cycloparaffins, small quantities of polycyclo-paraffins and aromatics and other hydrocarbons, and may be in a purified form or may contain oils depending upon their source and/or manner of recovery. The paraffinic hydrocarbon waxes which are particularly useful are those having a drop melting point (ASTM D127-63) of at least 110° F, preferably at least 145° F, an oil content (ASTM D721-65T) of not greater than 50 weight percent, preferably not greater than 20 weight percent, and a needle penetration value at 77° F (ASTM D1321-65) in the range of 1 mm to 20 mm, preferably 1 mm to 10 mm.

More specifically, the process of the invention may be carried out by charging the paraffinic hydrocarbon wax, calcium hydroxide and fatty acid to a heated vessel equipped with an agitator. The wax may be premelted before being charged or it may be melted in the vessel. The fatty acid may be handled likewise as appropriate. The calcium hydroxide, being a solid, may be charged using any convenient solids handling means such as an auger.

While the sequence of addition is not critical insofar as the invention is concerned, some advantages may arise by initially providing a molten wax in the vessel followed by addition of the solid calcium hydroxide. After the calcium hydroxide particles have been thoroughly dispersed by the vessel agitator the fatty acid, in liquid form, may be metered into the vessel. On the other hand, the fatty acid may be added prior to the calcium hydroxide. In either manner the rate of production of water, through reaction of the calcium hydroxide and fatty acid, may be easily controlled. This has significance for the reason that the process involves temperatures above the boiling point of water and consequently any water present or produced becomes vaporized and tends to cause some foaming of the mixture. Of course, any instance wherein foaming becomes a problem may be overcome by employing suitable equipment as is known in the art.

In any event, the mixture of materials are heated wih agitation to at least 150° C. Heating of the materials may continue while they are being added to the vessel. Generally speaking, the temperature of 150° C will not be achieved until after all of the materials have been added. It is preferred to heat the mixture to at least 180° C as this hastens the transformation of the mixture into the desired composition.

The transformation of the mixture may best be described as follows: the molten wax initially provides a continuous liquid phase in which the calcium hydroxide and fatty acid react in situ to provide the calcium salt and water. The calcium salt, being an insoluble solid, becomes thoroughly dispersed as particles throughout the wax while the water, for the most part, appears to be vaporized from the mixture. As heating of the mixture continues, there is an increase in viscosity. The mass first reaches a homogenous paste-like consistency and thereafter becomes point that the final temperature as hereinbefore noted will be reached and the composition is formed. Heating may be continued for a short period of time to insure completion of the transformation, even to higher temperatures short of degradative temperatures.

The hot mass is then removed from the vessel and cooled to ambient conditions whereupon the composition becomes a solid, glass-like friable material which can be ground or otherwise reduced to a particular form which substantially retains its discreteness and integrity. While the composition is a solid at ambient conditions and can be easily fractured or chopped at these conditions, it is perhaps more convenient and somewhat easier to grind the composition under cryogenic conditions. In either situation, the resultant particulate composition at ambient conditions can be easily handled with conventional solids handling equipment. Further, the particulate composition substantially maintains its integrity upon standing or being stored.

Generally, the process of this invention will employ a mol ratio of calcium hydroxide to fatty acid in the range of 0.5/1 to 1/1 and a weight ratio of wax to fatty acid in the range of 0.5/1 to 2/1. It is preferred that the mol ratio of calcium hydroxide to fatty acid be 0.55/1 to 0.65/1 and the weight ratio of wax to fatty acid be 0.9/1 to 1/1.

It is also possible to incorporate other additives into the compositions such as when they are employed as extrusion aids or lubricants. In these instances, other processing aids such as polyethylene waxes or acrylate polymers may be included, pigments such as $TiO_2$, fillers, and even reinforcing materials may be included.

The invention will be further illustrated by the following examples.

EXAMPLE 1

A Hobart mixer equipped with an electric heating mantel was charged with about 255 g of paraffinic hydrocarbon wax (Code 776) and about 281 g of stearic acid (industrial grade, Humko Industrene R). The wax had an average drop melting point of about 148° F, an average oil content of about 16 weight percent, and an average needle penetration value (77° F) of about 8.1 mm. With heating these materials were melted and then about 44 g of solid calcium hydroxide were added. With continuous agitation and heating, the temperature rose to about 180° C during which time the mixture was observed to pass through the phases described hereinbefore in the specification. The resulting product formed a ball on the agitator blade and was noted to be a homogenous, taffy-like material. Heating of the product was continued at temperatures of 180° C–210° C for an additional forty minutes. Upon cooling to ambient conditions, the product became hard and friable, very unlike the starting wax.

EXAMPLE 2

The process of Example 1 was repeated except that 37 g of solid calcium hydroxide were employed and the subsequent heating was not employed. The same results were achieved and while the product at ambient conditions was hard and friable, it was noted that it did not ball up on the agitator blade prior to cooling.

EXAMPLE 3

A further run was carried in accordance with the procedure of Example 2 except that 55 g of solid calcium hydroxide were employed. The final product was much like that of Example 1.

EXAMPLE 4

An additional run was carried out as described in Example 2 except that 74 g of solid calcium hydroxide were employed. A product comparable to those in the previous examples was obtained.

EXAMPLE 5

A further run was carried out using a procedure as described in Example 2 except that the following were employed: 255 g of a paraffinic hydrocarbon wax (Citcon Code 784) having an average drop melting point of about 165° F, an average oil content of about 3 weight percent and an average needle penetration value (77° F) of 1.5 mm; 280 g of a commercial grade double pressed stearic acid (Thompson-Heyward); and 47 g calcium hydroxide. The materials were heated to 190° C–200° C. The final product was much like that of Example 1.

EXAMPLE 6

A run was also carried out with the procedure described in Example 2 except that the materials employed were 300 g of a paraffinic hydrocarbon wax having an average drop melting point of about 148° F, an average oil content of about 16 weight percent and an average needle penetration value (77° F) of about 8.1 mm; 181 g tall oil fatty acid (Hercules Panak 985); and 44 g calcium hydroxide; and the materials were heated to about 190° C. The final product was similar to that of Example 1.

EXAMPLE 7

Similar results may be achieved using the process of Example 1 substituting palmitic acid or mixtures thereof with oleic acid.

EXAMPLE 8

A further run was carried out using a procedure generally as described in Example 1 except that a Ross mixer was used. About 2822 g of paraffinic hydrocarbon wax (Code 776) and about 1760 g of hydrogenated tallow fatty acid (Darling DAR-C) were charged and melted together while heating to about 150° C at which temperature 317 g of hydrated lime (Ash Grove Kemilime) were incrementally added over a period of 17 minutes with constant stirring. The wax had an average drop melting point of about 148° F, an average oil content of about 16 weight percent, and an average needle penetration value (77° F) of about 8.1 mm. During this period, the temperature rose to 188° C and the mixture was observed to pass through the phases described hereinbefore in the specification. The resulting product formed a ball on the agitator blade and was noted to be a homogenous, taffy-like material. Heating was continued at temperatures of 188° C to 195° C for an additional 25 minutes. Upon cooling to ambient conditions, the product became hard and friable.

EXAMPLE 9

To demonstrate the unique ability of the compositions prepared by the process of this invention to retain their discreteness compared to commercial wax used as an extrusion aid in PVC formulations two tests were run as follows:

20 g of a powdered sample (all of which pass a USS 30 mesh sieve) were placed in a 100 ml graduated cylinder (2.5 cm diameter). The loose volume was noted and a weight was placed on top and the initial compacted volume was noted. The sample was allowed to stand under weight for 1 hour at room temperature and the volume was again noted. The sample was then placed in an oven maintained at 60° C for 1 hour and the volume was again noted. The particulars of each run together with the results are indicated in the table.

TABLE

| Run No. | Weight (g) | Loose | VOLUME MEASUREMENTS (ml) Initial | Room Temperature 1 Hr | 60° C 1 Hr |
|---|---|---|---|---|---|
| 1[a] | 250 | 53 | 45 | 42 | 33[c] |
| 2[b] | 250 | 57 | 50 | 47 | 43 |

[a]Commercial paraffinic wax used in the thermoplastic formulations as extrusion aid, Aristowax X1-165.
[b]Composition prepared by process of invention according to Example 1 using 3481 g wax, 3638 g Thompson-Heyward double pressed stearic acid and 612 g calcium hydroxide.
[c]Sample fused to a solid cake.

As indicated hereinbefore, the compositions of this invention are suitable for use as extrusion aids in polymer formulations intended for processing by extrusion. These compositions not only provide the requirements of both the heretofore separately employed waxes and fatty acid salts but they also do not suffer from dusting problems when dry blended into extrusion formulations.

Thus having described the invention in detail, it will be understood by those skilled in the art that certain modifications and variations may be made without departing from the spirit and scope of the invention as described herein and defined in the appended claims.

We claim:

1. In an improved process for the extrusion processing of a thermoplastic polymer formulation using extrusion aids which are added to said thermoplastic polymer formulation prior to carrying out said extrusion, the improvement comprising utilizing an extrusion aid which is friable at ambient temperatures, prepared by mixing a paraffinic hydrocarbon wax, calcium hydroxide and a fatty acid while heating to a temperature of at least 150° C and thereafter cooling to recover a solid glass-like, friable composition, said paraffinic hydrocarbon wax having a drop melting point of at least 110° F, an oil content of not greater than 50 percent by weight and a needle penetration value (77° F) in the range of from 1 millimeter to 20 millimeters, and said fatty acid being a $C_{16}$–$C_{24}$ aliphatic hydrocarbon monocarboxylic acid or mixtures thereof.

2. The invention of claim 1 wherein the calcium hydroxide is mixed with the paraffinic hydrocarbon wax prior to adding the fatty acid.

3. The invention of claim 1 wherein the mol ratio of calcium hydroxide to fatty acid is in the range of 0.5/1 to 1/1.

4. The invention of claim 3 wherein the mol ratio is 0.55/1 to 0.65/1.

5. The invention of claim 3 wherein the weight ratio of wax to fatty acid is in the range of 0.5/1 to 2/1.

6. The invention of claim 4 wherein the weight ratio of wax to fatty acid is 0.9/1 to 1/1.

7. The invention of claim 1 wherein the paraffinic hydrocarbon wax has a drop melting point of at least 145° F, an oil content of not greater than 20 weight percent and a needle penetration value at 77° F in the range of 1 mm to 10 mm.

8. The invention of claim 7 wherein the fatty acid is palmitic acid, stearic acid, oleic acid, linoleic acid, tall oil fatty acid, eicosanic acid, behenic acid, or mixtures thereof.

9. The invention of claim 1 wherein a mixture of fatty acids is employed.

10. The invention of claim 9 wherein the mixture of fatty acids contains up to 15 weight percent of a $C_{14}$ aliphatic hydrocarbon monocarboxylic acid.

11. The invention of claim 1 wherein the composition is prepared by mixing the fatty acid with the paraffinic hydrocarbon wax prior to adding the calcium hydroxide.

* * * * *